Dec. 2, 1924.                                                                 1,517,753
DE SOTO E. RICHARDSON
FRUIT PICKING DEVICE
Filed April 18, 1922
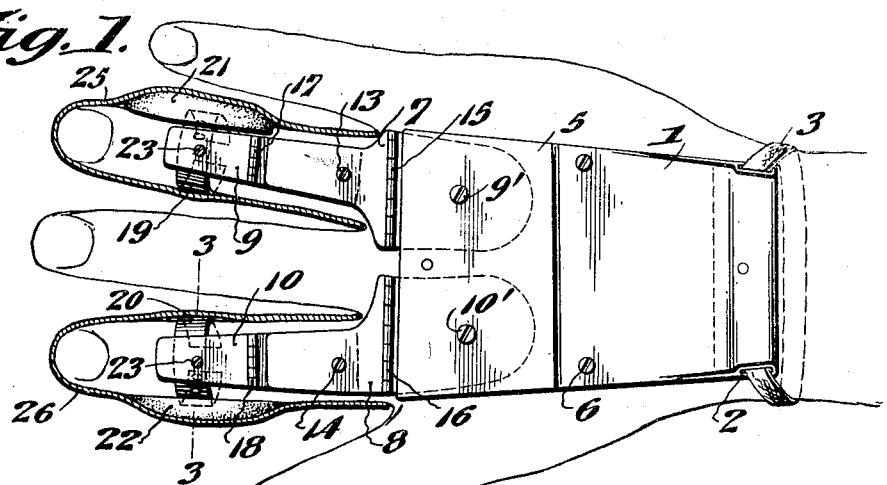
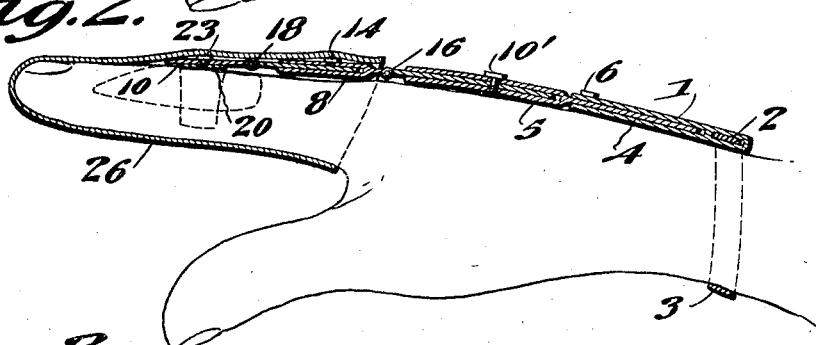
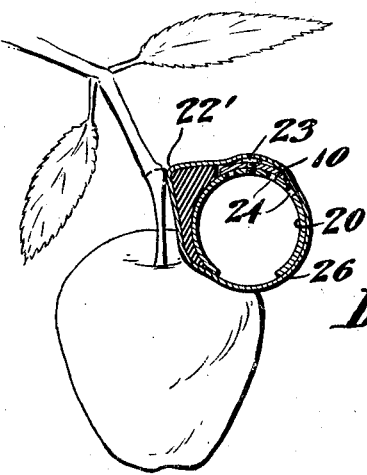
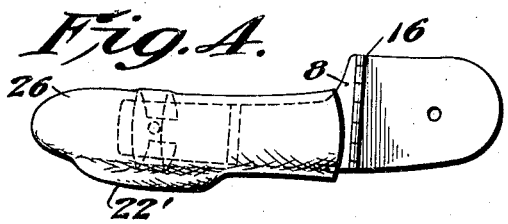
Inventor
De Soto E. Richardson
By Lloyd W. Patch
his Attorney Patented Dec. 2, 1924.

1,517,753

UNITED STATES PATENT OFFICE.

DE SOTO E. RICHARDSON, OF RIVERSIDE, WASHINGTON.

FRUIT-PICKING DEVICE.

Application filed April 18, 1922. Serial No. 555,009.

*To all whom it may concern:*

Be it known that I, DE SOTO E. RICHARDSON, residing at Riverside, in the county of Okanogan and State of Washington, citizen of the United States, have invented certain new and useful Improvements in Fruit-Picking Devices, of which the following is a specification.

My invention relates to an improvement in fruit picking devices, and particularly to a device of this character adapted to be used in hand picking fruit.

An object is to provide a fruit picking device in the form of a stem-joint breaker, which abruptly breaks the stem at the joint, instead of pulling the stem out of the fruit as is so often the case by the present hand method, thereby throwing extra fancy fruit into the cull grade, which at present averages from five to seven per cent total loss.

A further object is to provide a fruit picking device which will save this loss to the fruit growers and eliminate the hurting of the fingers of the fruit pickers while picking said fruit.

A still further object resides in so constructing the parts that the fruit will not be marred or injured.

With these and other objects in view which will be apparent from the specification, drawings and claims, this invention includes certain novel features of construction and combination of parts which will now be set forth.

In the drawings:—

Figure 1 is a top elevation view showing my fruit picking device on the hand and with parts in section to better illustrate the construction.

Fig. 2 shows a longitudinal sectional view of the device on the hand.

Fig. 3 is a sectional view on line 3—3 of Fig. 1 showing the stem-breaker in the act of breaking the stem at the joint of the fruit.

Fig. 4 shows the covering which prevents the metal parts from marring the fruit.

With the present hand method of picking fruit the picker in attempting to break the stem from the twig will quite often pull the stem from the fruit, thus frequently throwing extra and fancy fruits into the cull grade. My device is designed to aid the picker in breaking off the fruit at the stem joint.

A mounting plate 1 is provided with an opening 2 to receive a tape or strap 3 adapted to be secured around the fruit-picker's wrist to mount the plate on the back of the hand, and this plate has a recess 4 at its forward edge. An extension member 5 is provided with a tongue received in this recess and the two members are held in adjusted relation by set screws 6.

Finger pieces 7 and 8 are pivoted at 9' and 10' on the extension member 5, and at their outer ends have the extension finger pieces 11 and 12 mounted. These extension finger pieces are held in adjusted position by set screws 13 and 14. The finger pieces are positioned to extend adjacent the index and third fingers and are provided with hinge joints 15 and 16 to break over the knuckles, the extension pieces being hinged at 17 and 18 adjacent the main finger joints.

Spring clips 19 and 20 are mounted on the pieces 9 and 10, and are adapted to fit upon the fingers. Stem-breakers 21 and 22 are secured on the clips 19 and 20, and are disposed along the outer sides of the index and third fingers when the spring clips are fitted in place. These stem-breakers are of rubber or other suitable material and are made to present the blunt edge as shown at 22', in Fig. 3. By providing fastening screws 23 to hold the spring clips in place and forming a plurality of threaded openings 24 in the clip, each clip can be set to adjust the position of the blunt edge 22'.

To guard against bruising or marring of the fruit, rubber, canvas or leather finger stalls 25 and 26 may be used upon the fingers engaged by the spring clips to thus prevent contact of any metal parts with the fruit.

In use the various pivot and hinge joints will allow the fingers to be spread and closed at the will of the operator, and with perfect freedom.

While I have herein shown only one specific embodiment, it will be appreciated that changes and modifications can be made to suit various requirements of use and hence I do not wish to be limited to the exact disclosure but only to such points as may be defined in the claims.

I claim:

1. A fruit picking device comprising a stem-breaker, means to hold the stem-breaker upon a finger, and a protective cover over the stem-breaker.

2. A fruit picking device comprising a stem-breaker having a blunt edge, means to hold the stem-breaker upon a finger to present the blunt edge in position to be brought against the stem joint of the fruit to break the stem at this point, and a protective cover over the stem-breaker and holding means.

3. A fruit picking device comprising a stem-breaker, a jointed plate secured upon a hand to hold the stem-breaker adjacent one of the fingers, and a protective covering over the stem-breaker and the joint plate.

4. A fruit picking device comprising a mounting plate to be secured on the hand of the picker, a finger piece pivoted on the mounting plate and extending adjacent one of the fingers, a stem-breaker carried by the finger piece to be at one side of the finger, and a soft protective covering over the stem breaker and finger piece.

5. A fruit picking device comprising a mounting plate to be secured on the hand of the picker, a finger piece pivoted on the mounting plate and extending adjacent one of the fingers, and a rubber stem-breaker provided with a blunt edge carried by the finger piece to present the blunt edge against the fruit stems as fruit is picked.

6. A fruit picking device comprising a mounting plate to be secured on the back of a fruit picker's hand, jointed finger pieces pivoted on the mounting plate to extend adjacent fingers of the hand, spring clips adjustable on the finger pieces to engage the fingers, and stem-breakers carried by the clips.

7. A fruit picking device comprising a mounting plate to be secured on the back of a fruit picker's hand, jointed finger pieces pivoted on the mounting plate to extend adjacent fingers of the hand, spring clips adjustable on the finger pieces to engage the fingers, stem-breakers carried by the clips, means to adjust the parts for different sizes of hands, and means to cover the parts of the device on the fingers.

8. A fruit-picking device comprising a stem-breaker of substantially triangular shape in cross-section, and means to hold the stem-breaker to extend longitudinally upon a finger with one of the edges thereof presented along the length of the finger.

In testimony whereof I hereunto affix my signature.

DE SOTO E. RICHARDSON.